Nov. 14, 1950        E. R. KEHRER        2,529,843
CONTACT MASS LEVEL CONTROL

Filed Feb. 25, 1948        3 Sheets-Sheet 1

INVENTOR.
EDDIE R. KEHRER
BY
AGENT OR ATTORNEY

Nov. 14, 1950 E. R. KEHRER 2,529,843
CONTACT MASS LEVEL CONTROL
Filed Feb. 25, 1948 3 Sheets-Sheet 2
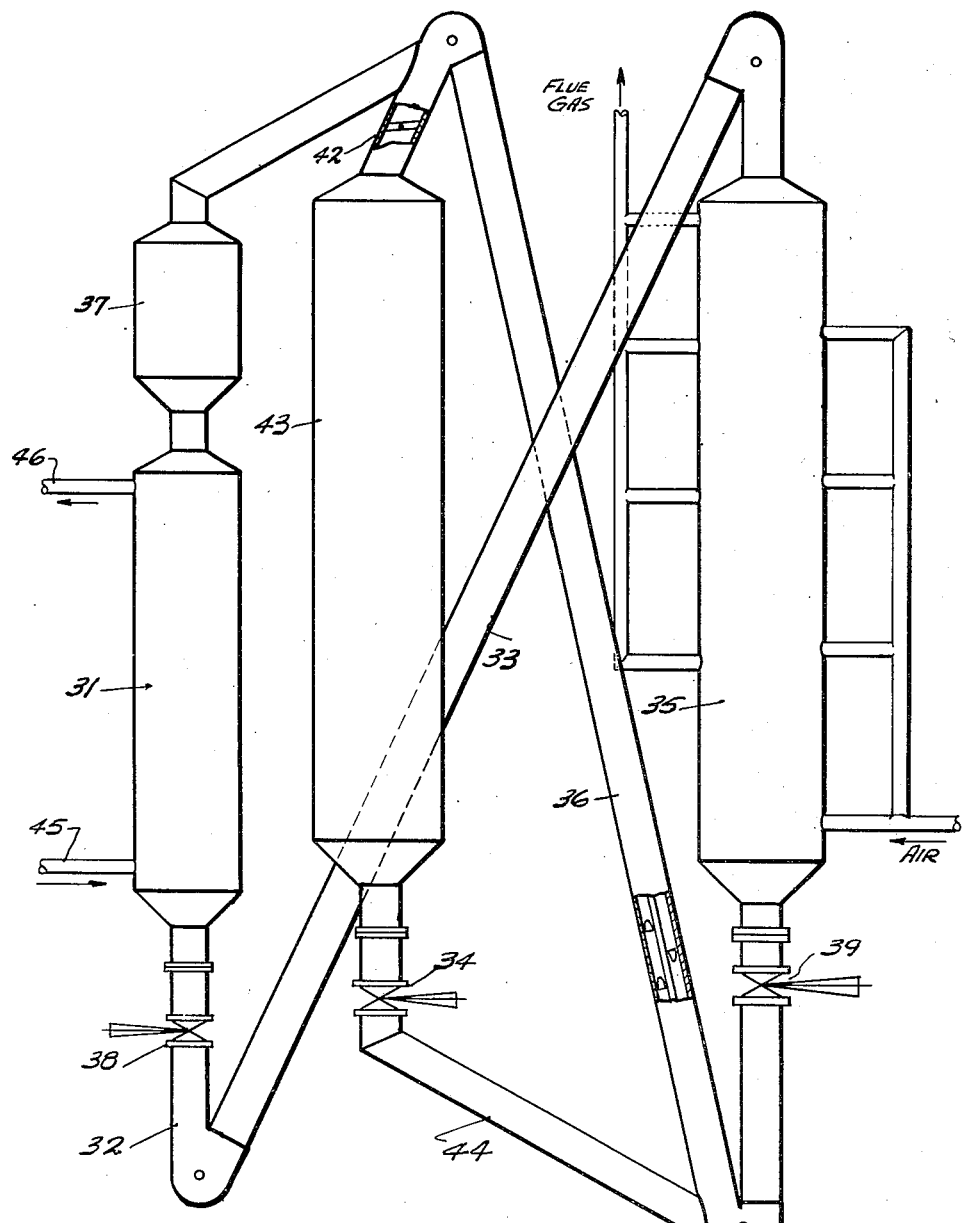
Fig. 2
INVENTOR.
EDDIE R. KEHRER
BY
AGENT OR ATTORNEY Nov. 14, 1950  E. R. KEHRER  2,529,843
CONTACT MASS LEVEL CONTROL
Filed Feb. 25, 1948  3 Sheets-Sheet 3

INVENTOR.
EDDIE R. KEHRER
BY
AGENT OR ATTORNEY

Patented Nov. 14, 1950

2,529,843

UNITED STATES PATENT OFFICE 2,529,843

CONTACT MASS LEVEL CONTROL

Eddie R. Kehrer, Beaumont, Tex., assignor to Socony-Vacuum Oil Company, Incorporated, New York, N. Y., a corporation of New York Application February 25, 1948, Serial No. 10,839

1 Claim. (Cl. 196—52)

This invention is concerned with processes which use a moving bed of particle size solid material. It is specifically designed to improve the control of catalyst flow in a continuous, catalytic cracking process of petroleum hydrocarbons.

Early catalytic cracking of petroleum hydrocarbons was performed in chambers called cases. The chamber contained a fixed charge or bed of catalyst which remained constant during the cracking operation. Charge stock, prepared for cracking, was admitted to the chamber, maintained at a high temperature, and cracked products were removed until the catalyst became ineffective because of surface carbonization. The case was then taken off stream and the catalyst purged or regenerated in place by burning the carbon from the surface of the catalyst. The operation was, therefore, not continuous, but intermittent.

The catalytic cracking of petroleum hydrocarbons has recently been made continuous by the use of particle size catalyst material capable of being kept in motion through a continuous cycle of reaction and regeneration without disturbing the cracking of the hydrocarbons in the reactor. In essence, the system comprises passing catalyst particles at a uniform rate of flow through the reaction zone. Spent catalyst is continuously removed at a uniform rate from the reactor, conducted to a regenerator, passed through the regenerator wherein it is revivified, collected from the regenerator and returned to the entrance of the reactor, completing the closed cycle of operations. As a consequence, charge stock can be supplied continuously to the reactor and cracked distillates removed therefrom for long periods of operation. Periodic shutdown of the apparatus is necessitated for various reasons, one of which is mechanical failure of the operating parts.

The types of products obtained and the yields produced depend upon many operating factors, such as for example, reaction temperature, reaction pressure, charge stock flow rate, catalyst flow rate, charge stock preheat, as well as upon the condition of the catalyst and even the type of crude stock being run. Inasmuch as all of the factors are interrelated, it is desirable to fix the operation and maintain the variables constant, within narrow limits, to obtain maximum yield of the desired end products.

In these continuous processes for the cracking of hydrocarbons such as shown in the various patents, for example, of Simpson, Payne and Crowley, such as 2,336,041 and other patents, the particle size contact mass is stored in bins, surge hoppers and the like, at temperatures of the order of 600–1100° F., and very frequently under a blanketing atmosphere of inert gas under pressure. In a typical continuous catalytic cracking system, the revivified catalyst particles are raised by means of a mechanical elevator to the top of the storage hopper disposed on top of and connecting with the reaction vessel. Should lack of balance between rate of catalyst flow through the elevator and rate of catalyst delivery by the elevator occur, the storage hopper may back up and flood the discharge boot of the elevator with catalyst, usually resulting in major damage and shutdown. While infrequent in occurrence, the consequences of such an unbalance, if it does occur, are sufficient to warrant serious attention to preventive maintenance.

Measuring the level of catalyst in the hopper atop the reaction vessel, although difficult, because the hopper directly connects to the reactor in which the reactant hydrocarbon vapors are confined at temperatures up to approximately 1100° F., can be performed by one of several available methods. One such method, proved by the rigorous duty of actual service, is described with reference to Figure 1. The device is mounted atop a storage hopper 10 containing a solid particle size material 9, the method of mount not being shown. The device comprises a tube 11 capable of rotary motion only. The tube 11 is rotated at a constant speed by a pair of mating gears 12 and 13. Gear 12 is permanently fixed to the periphery of tube 11 and worm gear 13 is attached to a source of rotational power not shown. A shaft 14, located through the tube 11, possesses external threads which mate with internal threads in the tube. At the lower end of the shaft 14, which projects through a seal into the storage hopper 10, is disposed equally spaced blades so designed as to support the shaft on the surface of the bed of particle-form material in the hopper when the shaft is rotated. A portion of the weight of the shaft is counterbalanced by a counterweight 19, connected to the top of the shaft 14 by means of flexible member 17, which passes over the pulleys 16. The uncounterbalanced weight of the shaft is made sufficient to cause the shaft to overcome the friction of the mating threads 8 and fall into the hopper until sufficient support is obtained from the vanes 21 moving over the surface of the granular bed in the hopper. A pointer 18 is mounted on the flexible member 17 such that it will align itself with indications on a calibrated scale 20, thereby indicating the depth of catalyst in the hopper. The mating threads 8 are disposed so that should the vanes 21 become buried in the catalyst, causing the shaft to cease rotating, the shaft 14 will be lifted until free.

The catalyst flow rate is adjusted by valves placed in the flow system to the predetermined value, considering the desired end products and all the other interrelated variables. When troubles develop in the catalyst flow system which interfere with the desired flow of catalyst particles, the level of catalyst in the storage hopper atop the reactor rises, eventually spilling back into the elevator, making serious damage of the elevator and its related parts a distinct possibility.

Although the catalyst level indicator device, described above, may be used as a warning of irregular catalyst flow rate, it is often impossible to shutdown the complicated apparatus before serious catalyst spill-back has occurred, with resulting damage as hereinabove indicated.

The object of this invention is to protect the elevators and related parts of a continuous catalytic cracking system from the dangers attendant irregular catalyst flow rate.

Figure 2 is a schematic drawing of an improved continuous catalytic cracking apparatus.

Figure 1:
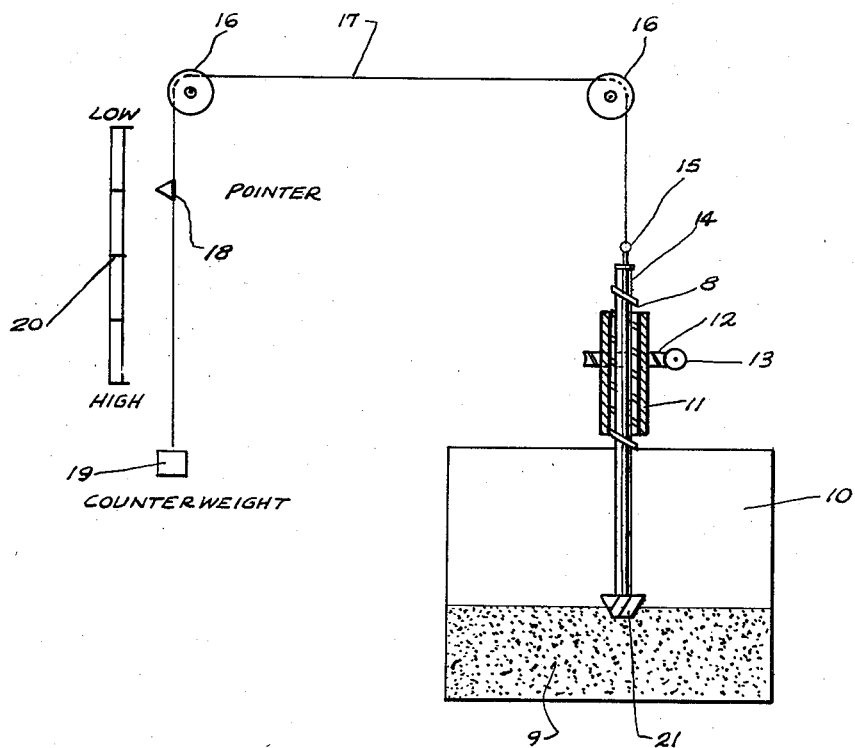
Figure 1 is a schematic drawing of a catalyst level indicator.

The path of the catalyst particles may be followed by reference to Figure 2. The catalyst flows downward through the reactor 31. Preheated hydrocarbon charge stock is admitted continuously through pipe 45 to the reactor where the hydrocarbons at high temperature and intimately mixed with the catalyst are cracked. The cracked products are continuously removed through pipe 46. Details of the reactor and regenerator may be obtained from the various patents upon continuous processes for the cracking of hydrocarbons, for example, of Simpson, Payne and Crowley, such as 2,419,507 and need not be described in detail here. The spent catalyst is removed from the bottom of the reactor and conducted through the conduit 32 to the bottom of an elevator 33. The catalyst particles raised by the elevator 33 fall through a regenerator 35, then to the bottom of another elevator 36. Catalyst raised by the elevator 36, normally flows into the hopper 37, falling into the reactor 31 to complete the process. The catalyst flow rate is adjusted, considering its interrelation with the other operating variables in determining the types and yields of end products, by the control valves 38 and 39. The depth of catalyst in the hopper, being measured by an indicator, as previously described, should remain constant during the cracking process. Unavoidable interference with the catalyst flow, as previously described, may cause the catalyst level in the hopper to rise. In this invention, when the prescribed high level limit in the primary hopper 37 is exceeded, the butterfly valve 42 is opened automatically, providing an alternate path for catalyst to flow. The surplus catalyst is collected in the auxiliary hopper 43, until the catalyst level is corrected by the removal of the operational difficulty or the system is shut down for repair. When a shortage of catalyst in the system develops, the catalyst stored in the auxiliary hopper 43 may be fed through the conduit 44, by control valve 34, to the bottom of the elevator 36, thereafter following the normal catalyst flow path.

Figure 3:
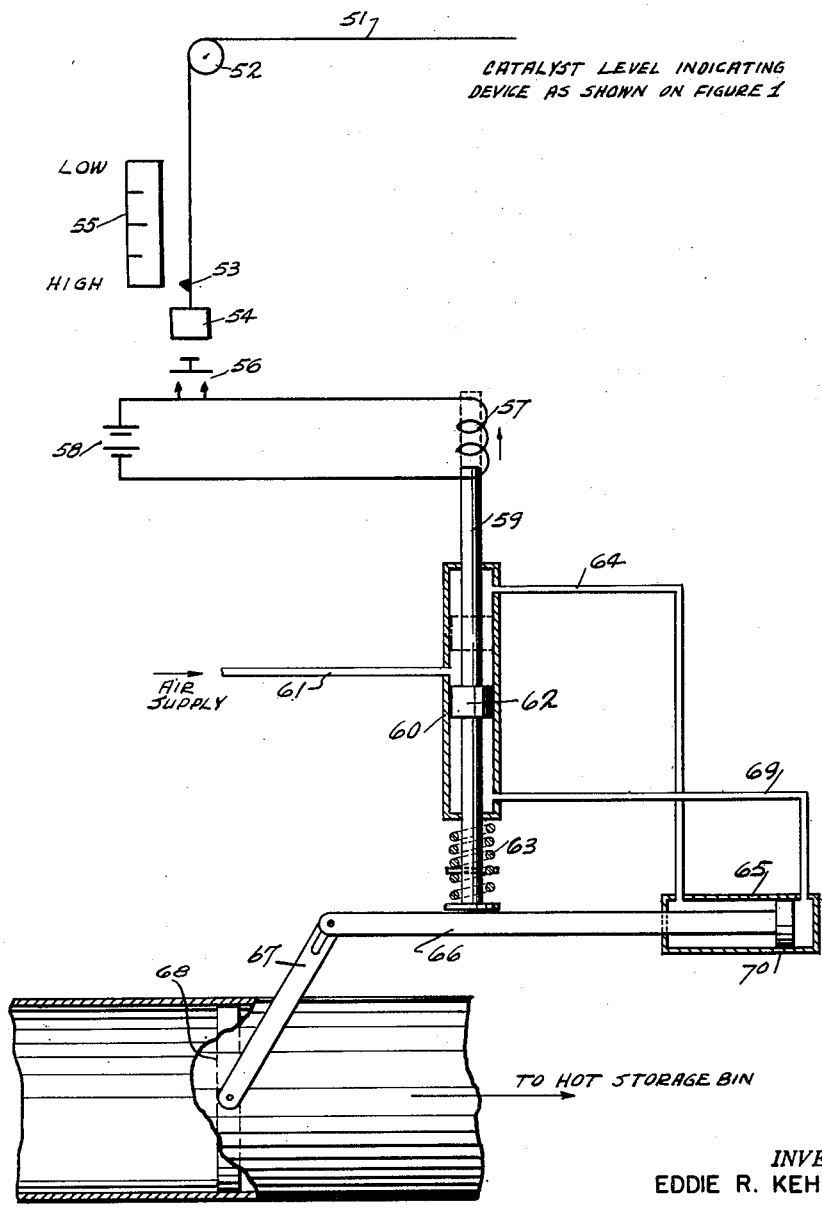
Figure 3 is a schematic drawing of automatic control apparatus which can be used in this invention.

Many methods are available for automatically operating the catalyst by-pass valve, controlled by the catalyst level in the primary hopper. One such method is shown on Figure 3. A portion of a catalyst level indicator is shown, similar to the indicator previously described. The flexible member 51, supported on pulley 52, has the pointer 53 and counterweight 54 on one end. The remainder of the indicator is not shown in this figure.

The shaft 59 is the moving member of a pilot valve 60, the piston 62 of the valve being concentric with, and directly attached to, the shaft. A spring 63 is located on the lower end of the shaft so that when the solenoid 57 is not energized, the shaft is held in the down position as shown. In this position air under pressure is admitted to the valve through pipe 61 from a source not shown and discharged from the valve through pipe 64 to an actuating cylinder 65. The shaft 66 of the actuating cylinder is connected by linkage 67 to the butterfly valve 68 in the auxiliary hopper feed conduit. The air pressure in the cylinder 65 maintains the butterfly valve in the closed position and the catalyst particles follow their normal path through the reactor.

When the catalyst level in the primary hopper rises above a predetermined high level limit, the pointer 53 drops below the high mark as shown on the scale 55. A switch 56, appropriately placed below the counterweight 54, makes contact, energizing the solenoid 57. Power for this circuit can be provided by a battery 58 or any other convenient source of power. The force derived from the energized solenoid causes the pilot valve to shift to the position shown dotted. The compressed air, therefore, is discharged from the pilot valve through line 69 to the opposite side of the piston 70 in the actuator cylinder causing the shaft 66 to shift, whereby the butterfly valve 68 is opened. Catalyst then flows into the auxiliary hopper, thereby protecting the elevator casing, buckets and machinery from possible serious damage.

I claim:

The method of controlling the flow of a catalyst to a hydrocarbon reactor that comprises continuously delivering catalyst to a point above the reactor, flowing the catalyst as a continuous dense gravitational mass from said point to a hopper located above the reactor, continuously measuring the catalyst level within the hopper, and establishing a gravitational flow path from said delivery point to a storage zone normally isolated from said point when the level of the catalyst in the hopper rises above a predetermined point while maintaining the flow path from said point to said hopper.

EDDIE R. KEHRER.

REFERENCES CITED

The following references are of record in the file of this patent:

UNITED STATES PATENTS

| Number | Name | Date |
|---|---|---|
| 2,290,580 | Degnen et al. | July 21, 1942 |
| 2,379,027 | Monro | June 26, 1945 |
| 2,443,180 | Bergstrom | June 15, 1948 |
| 2,458,162 | Hagerbaumer | Jan. 4, 1949 |

FOREIGN PATENTS

| Number | Country | Date |
|---|---|---|
| 76,114 | Sweden | Dec. 20, 1932 |